Nov. 7, 1933.  E. P. MAYNARD  1,934,270
CONTROLLED COASTER WHEELING MECHANISM FOR MOTOR DRIVEN VEHICLES
Filed May 12, 1932  2 Sheets-Sheet 1
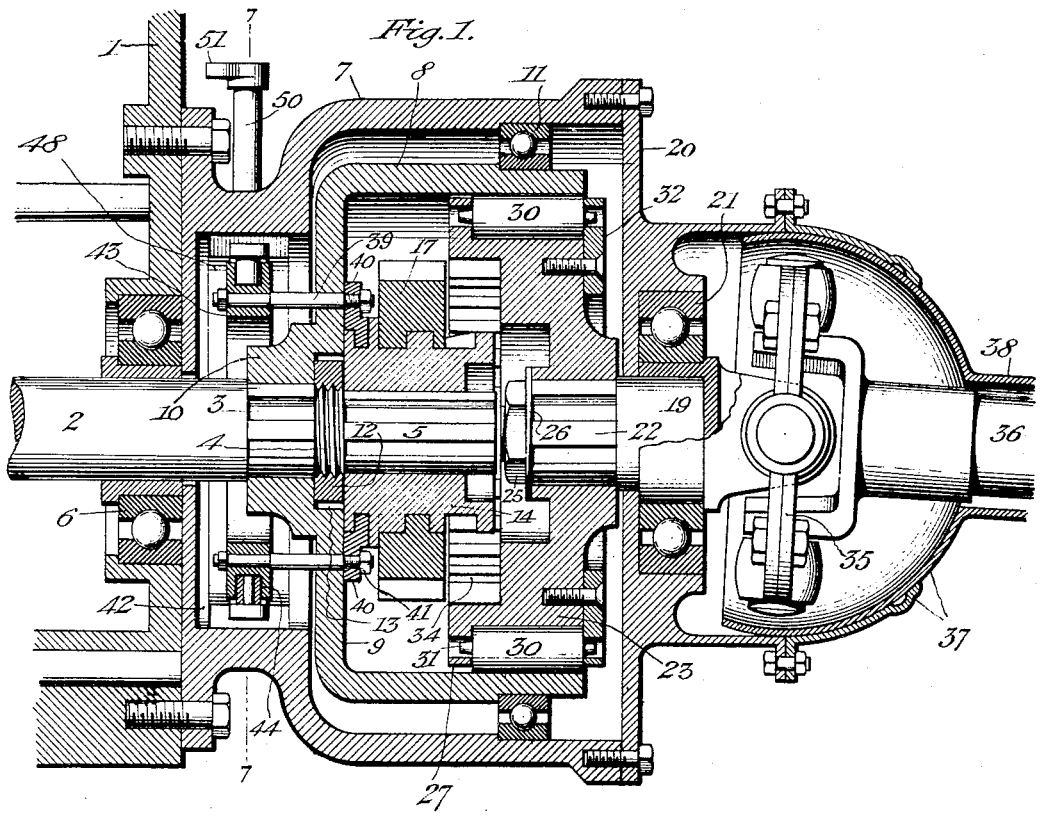
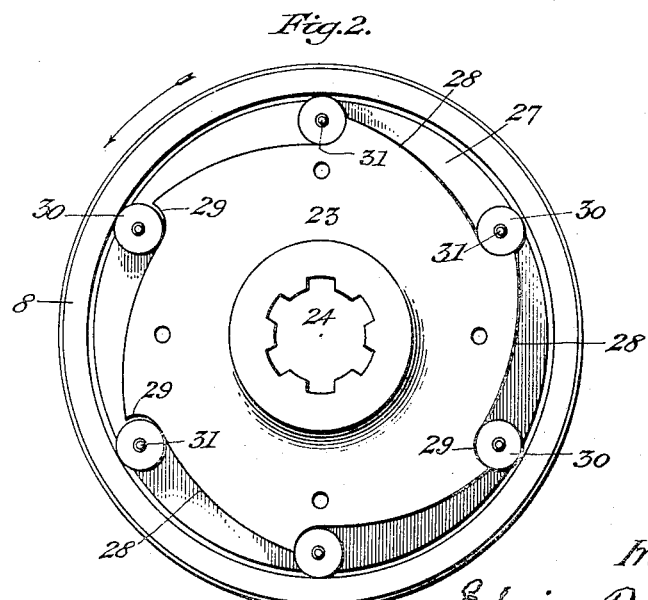
Inventor:
Edwin P. Maynard.
By H. S. Bailey, Attorney.

Nov. 7, 1933.  E. P. MAYNARD  1,934,270
CONTROLLED COASTER WHEELING MECHANISM FOR MOTOR DRIVEN VEHICLES
Filed May 12, 1932
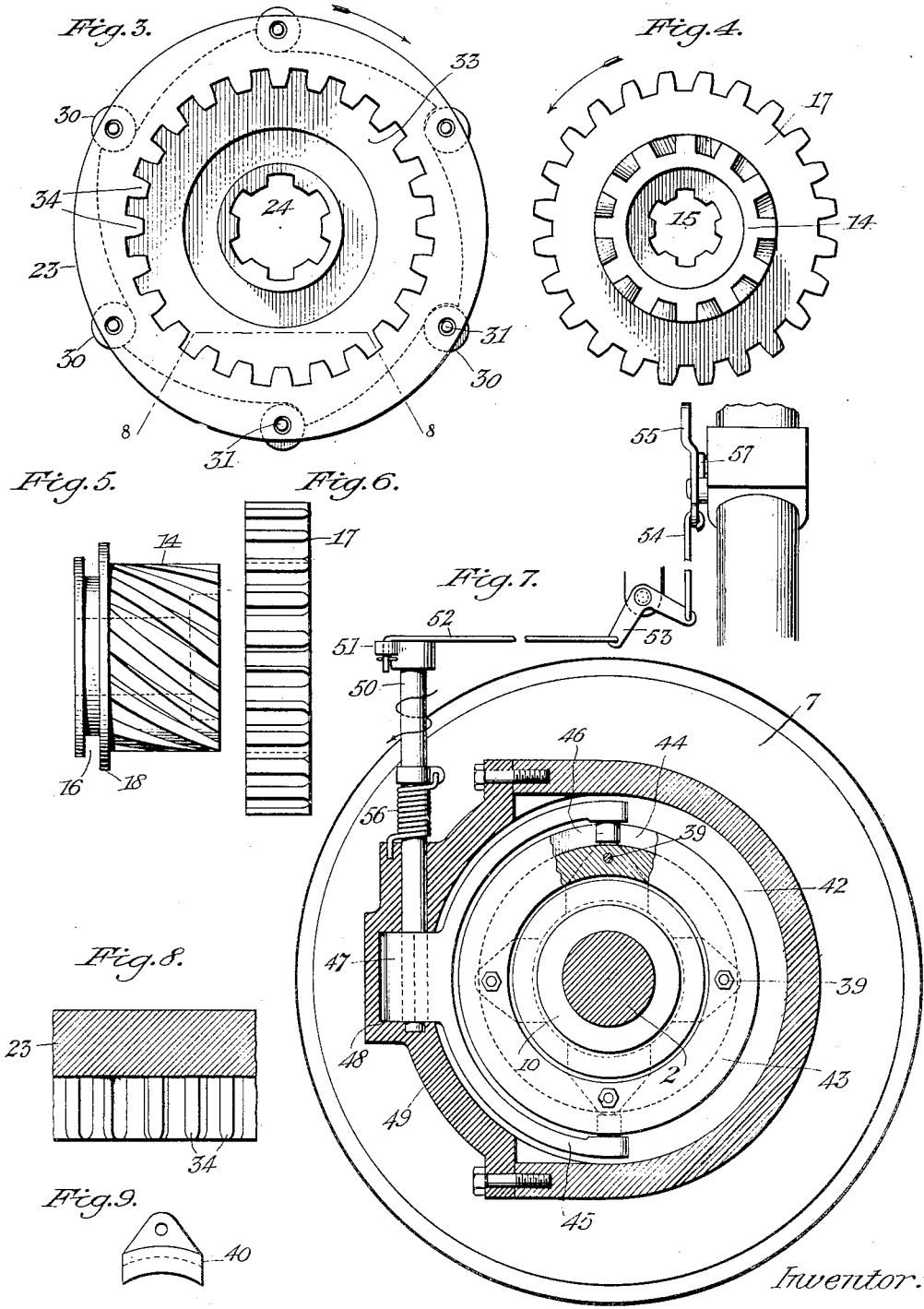

Patented Nov. 7, 1933

1,934,270

UNITED STATES PATENT OFFICE 1,934,270

CONTROLLED COASTER WHEELING MECHANISM FOR MOTOR DRIVEN VEHICLES

Edwin P. Maynard, Denver, Colo.

Application May 12, 1932. Serial No. 610,861

8 Claims. (Cl. 192—48)

My invention relates to improvements in controlled coaster wheeling mechanism for motor driven vehicles, and is designed as an improvement over a device of this character which was filed by me on the 27th day of August, 1931, Serial No. 559,690.

The primary object of the invention is to provide a positively operating double clutch mechanism for connecting the transmission sliding gear shaft with the propeller shaft; one of said clutches effecting forward propulsion and the other, rearward propulsion, the rearward movement clutch connection being automatically effected, upon the reverse movement of the gear shift lever, and the clutch members effecting the reverse movement being automatically disconnected on the forward driving movement of the gear shift lever, thus permitting the forward driving clutch to act, and thereby relieving the driver of the vehicle of all thought or responsibility as to clutch connections.

Further, to provide mechanism comprising a driving clutch member operated by the sliding gear shaft and a driven clutch member connected to the propeller shaft, said members being automatically disconnected when the speed of the propeller shaft exceeds that of the sliding gear shaft, thereby permitting the vehicle to coast on down grades and under momentum on level grades and thus permitting the slowing down or stopping of the engine; automatically locking clutch members being provided for reversing the movement of the vehicle, one of said members being slidable with respect to the sliding gear shaft and being operated thereby and being adapted to be manually locked with its cooperating member which is formed in said driven clutch member, when coaster wheeling is not desired, the forward driving clutch being then out of commission and therefore, free from wear.

Further, to provide a motor driven reverse driving clutch member which cooperates with a clutch member on the propeller shaft driving clutch member, said reverse driving clutch member being axially mounted on a spirally toothed pinion which is slidably but nonrotatably mounted upon the sliding gear shaft, said spirally toothed pinion acting to instantly couple the reverse driving clutch member with its cooperating member on the reverse movement of the sliding gear shaft, resilient means being provided for normally preventing the sliding movement of the said spirally toothed pinion, and manually operable means being provided for sliding the said spirally toothed pinion with its reverse driving clutch member, to lock said member to its cooperating clutch member.

Further, to provide coaster wheeling mechanism which is detachably secured upon the rear end of the transmission casing; which is simple in construction and positive in action, and in which the clutches are automatically coupled either in forward or reverse movement without loss of motion.

These and other objects which will hereinafter appear, are accomplished by the mechanism illustrated in the accompanying drawings in which:

Fig. 1 is a vertical, longitudinal sectional view of the improved coaster wheeling mechanism, in connection with the transmission and propeller shafts, the clutch mechanism being set to permit coaster wheeling.

Fig. 2 is a rear view of the assembled forward driving clutch members, the circular plate which holds the friction rollers in place being removed.

Fig. 3 is a front view of the driven member of the forward driving clutch, showing the internal clutch teeth in its face which are adapted to be engaged by corresponding teeth on the driving member of the reverse clutch.

Fig. 4 is a rear view of the driving member of the reverse clutch axially mounted upon its operating spirally toothed pinion, which is slidably but nonrotatably mounted on the sliding gear shaft.

Fig. 5 is an edge view of the spirally toothed drive pinion for the reverse drive clutch member.

Fig. 6 is an edge view of the reverse driving clutch member which is axially mounted upon and driven by the spirally toothed pinion.

Fig. 7 is a sectional view on the line 7—7 of Fig. 1 showing the manually operated mechanism for shifting the spirally toothed pinion to cause the reverse driving clutch member to engage its cooperating driven member, when free wheeling is not desired.

Fig. 8 is a sectional view on the line 8—8 of Fig. 3, showing the rounded outer ends of the internal clutch teeth, and Fig. 9 is a front view of one of the shoes for sliding the spirally toothed pinion.

Referring to the accompanying drawings:—

The numeral 1 designates the transmission case and 2 the sliding gear shaft, which, in the present instance is slightly longer than the usual shaft and is provided beyond the end of the transmission case with a splined portion 3, a threaded portion 4, and a second splined portion 5 which extends from the threaded portion 4 to the adjacent end of the shaft. The shaft is supported at this end of the transmission case by the usual ball bearing 6.

Upon this end of the transmission case is bolted a circular housing 7 which encloses the improved coaster wheeling mechanism, which is constructed and arranged in the following manner:

Upon the splined portion 3 of the shaft 2 is axially mounted a hollow cylindrical member 8, which is open at its rear end, its opposite end being closed by a wall 9 having a hub 10 provided with a grooved hole which fits upon the said splined portion 3. This member constitutes the forward driving clutch member, and between it and the housing 7 is interposed a ball bearing 11 of the usual type.

The member 8 is secured in place by a nut 12 which is screwed upon the threaded portion 4 of the shaft 2. This nut lies in a recess 13 in the end wall of the member 8 and clamps the end of the hub 10 against a shoulder on the shaft 2 as clearly shown in Fig. 1.

Upon the splined portion 5 of the shaft 2 is mounted a spirally toothed pinion 14 the axial hole 15 in which is grooved to receive the splines on the shaft, as shown in Fig. 4. The forward portion of this pinion is flanged or of slightly greater diameter than the remaining toothed portion, and is provided with an annular groove 16, the purpose of which will later appear, and the grooved end of the pinion normally rests against the end wall 9 of the driving clutch member 8. Upon the pinion 14 is mounted the reverse driving clutch member 17, which is in the form of a ring, the periphery of which is formed with straight clutch teeth, while the interior wall is formed with spirally arranged teeth which engage the teeth on the said pinion 14. The teeth on the pinion 14 are pitched as shown in Fig. 5, so that on the forward driving movement of the shaft 2, the clutch ring 17 would be forced against the flange 18 on the forward end of the pinion, while, on the reverse movement of the shaft 2, the clutch ring 17 would be moved rearward on the pinion, and caused to engage its cooperating clutch member, as will hereinafter appear.

In line with the shaft 2, is a short shaft 19, which extends through a cap plate 20 which is bolted to the end of the housing 7 and through a ball bearing 21 which is suitably supported on the said cap plate. The front end of the shaft 19 is splined as shown at 22, and upon this splined end is axially mounted a circular block 23, having an axial hole 24, grooved to correspond with the splines on the said shaft 22, as shown in Figures 2 and 3, and the block is held upon the shaft by a nut 25 and a washer 26 which is interposed between the nut and the block.

The front end of the block is formed with an annular wall or flange 27 which fits loosely within the forward driving clutch member 8, and the periphery of the block, from the flange 27 to its rear end is in the form of a series of curved surfaces or cams 28, which are tangent to the axis of the block; the lowest point of each curved surface terminating in a curved shoulder 29 which connects it with the highest point of the adjacent curved surface, so that each curved surface or cam inclines outwardly from its lowest to its highest point. Six of these cams are shown in Fig. 2, but a greater or less number may be employed, as may be desired. Rollers 30 are inserted between the cams 28 and the wall of the clutch member 8 and rest against the curved shoulders 29, the rollers being of such diameter that only a very slight space separates them from the wall of the clutch member. The ends of the rollers are provided with short trunnions 31, which fit loosely in bearing holes in the block flange 27 and in similar holes in a flat ring 32 which is bolted to the rear end of the block to hold the rollers against endwise movement. The front face of the block 23, is formed with a circular recess 33, the marginal wall of which is formed with internal clutch teeth 34, which are adapted to be engaged by the teeth on the reverse driving clutch ring 17 which is of a corresponding diameter with that described by the internal clutch teeth.

The reverse driving clutch member or ring 17 is automatically shifted into engagement with the internal clutch teeth 34, by the spirally toothed pinion 14, on the reverse movement of the sliding gear shaft 2; the block 23 and forward driving clutch member 8 turn in unison, and the member 8 is out of frictional engagement with the block 23. But when the shaft 2 is again given a forward movement rotation, the pinion 14 withdraws the clutch ring 17, and the forward driving clutch member 8 frictionally grips the block 23 through the rollers 30, and the vehicle is thus moved forward. The disconnection of the ring 17 from the block 23 occurs when both members are moving in the same direction and at the same speed, and therefore the parts cannot jam. When the ring 17 is out of engagement with the block 23, as shown in Fig. 1, only a very slight space separates them, so that there is practically no lost motion, when the teeth on the ring are brought into clutch relation with the internal clutch teeth 34. Thus the block 23 with its internal clutch teeth 34 and rollers 30, constitutes the driven clutch member both for forward and reverse movements. The end edges of the clutch teeth both on the ring 17, and block 23 are rounded so as to facilitate their engagement as the ring is moved toward and into the block.

Upon the end of the shaft 19 is secured one member of the usual universal joint 35 the other member being secured to the adjacent end of the propeller shaft 36, and the universal joint is inclosed in the usual two-part housing 37 one part being carried by the cap plate 20 and the other part by the torque tube 38 which surrounds the propeller shaft.

A series of equidistant pins 39, preferably four, extend slidably through holes in the end wall 9 of the forward driving clutch member 8, and upon the rear ends of these pins are mounted shoes 40, which are of the shape shown in section in Fig. 1, and in front view, Fig. 9, and which have arcuate portions which enter the annular groove 16 in the end of the pinion 14.

The shoes are held in place by nuts 41 which are screwed upon the pins. The pins extend into an annular chamber 42 in the housing 7, and upon their forward ends is secured a relatively thick ring 43 having an annular groove 44 in its periphery. A semicircular yoke 45 surrounds the ring on one side and the ends of the yoke are provided with rollers 46 which enter the groove 44 in the ring. The yoke is provided centrally with a projecting lug 47 which enters a recess 48 in a cap plate 49 which is bolted to this side of the housing and covers an opening into the chamber 42.

A shaft 50 is mounted in an offset portion of the cap plate, and its lower portion is squared and enters a corresponding opening in the lug 47 on the yoke 45. The upper end of the shaft 50 carries a short lever arm 51 which is connected by a rod 52 with one end of a bell crank 53, the other end of which is connected by a rod 54 with a suitable hand lever 55, mounted on a convenient part of the vehicle, preferably the steering post. A coil spring 56 surrounds the shaft 50 above the offset, one end of which is secured to the offset while the other end is secured to the shaft. The normal tendency of the spring is to cause the yoke to exert a forward tension on the ring 43, thereby causing the shoes 40 on the pins 39, to hold the pinion 14, against the end wall 9, of the forward driving clutch member, in which position of the pinion, the reverse driving clutch member or ring 17 is out of engagement with its cooperating clutch teeth in the block 23, thus permitting either the engagement of the clutch members 8 and 23 for forward driving, or their disengagement to permit coaster wheeling. When coaster wheeling is not desired, the hand lever 55 is drawn upon, and the shaft 50 is turned through the medium of rods 54, 52, bell crank 53, and lever arm 51, thereby swinging the yoke 45, which shifts the ring 43, thereby causing the shoes 40 to push the pinion 14 rearward until the reverse driving clutch member or ring 17 which abuts against the flange 18 of the pinion, is in clutch engagement with the teeth 34 in the block 23, thus positively connecting the sliding gear shaft 2, with the propeller shaft through the medium of the block 23, so that both shafts will run together and at the same rate of speed; and the forward driving clutch member 8, rollers 30, and cams 28, will cease to function as a clutch, thus relieving these parts of wear. When the hand lever 55 is drawn back, it is locked in any suitable manner, as by a pawl 57, to prevent the spring 56 from reversing the shaft 50, which would cause the shoes 40 to slide the pinion 14 forward and thus withdraw the cluch member 17, from engagement with the clutch teeth 34.

When the forward driving clutch member 8 rotats in the direction indicated by the arrow in Fig. 2, the rollers 30 are gripped between the wall of the said clutch member and the cam faces 28 of the block 23, by which the block is locked to the clutch member 8 and rotated thereby; but on the reverse movement of the clutch member 8, the rollers are instantly released or cease to function as clutches, and the spirally toothed pinion 14 shifts the clutch member 17 into clutch relation with the teeth 34 of the block 23, and the block, the intermediate shaft 19 and the propeller shaft 36 are moved in a reverse direction.

In assembling the parts, the pins 39 are secured at one end in the grooved ring 43 and the free ends of the pins are passed through the holes in the end wall 9 of the forward driving clutch member 8, and the member is then secured upon the splined portion 3 of the shaft 2, by the nut 12. The pinion 14 is then slipped upon the splined portion 5 of the shaft 2, and the shoes 40 are first placed in the groove 16 of the pinion and their apertured outer ends are slipped upon the ends of the pins 39 and secured thereon by the nuts 41. The yoke 45, which is mounted in the cap plate 49, is then inserted in the opening in the housing, its rollers 46 entering the groove in the ring 43, and the cap plate is bolted to the housing, as clearly shown in Fig. 7. The clutch member 17 is then placed upon the pinion 14; the block 23 in which is secured the shaft 19, is inserted in member 8, the cap 20 is bolted to the housing 7, and the universal joint connection is made in the usual manner.

In operation, for coaster wheeling, the parts are arranged as shown in Fig. 1, and in forward driving the member 8 operates the propeller shaft through the block 23 and clutch rollers 30, but on down grades, the increasing speed of the propeller shaft disconnects the clutch connections between the shaft 2, and the propeller shaft thus permitting the propeller shaft to run free of the shaft 2, so that the car may coast without affecting the transmission gearing and will continue to do so until the shaft 2 maintains or picks up the speed of the propeller shaft, when the clutch members 8 and 23 will again connect through the rollers 30. Immediately upon the reverse movement of the sliding gear shaft 2, the pinion 14, will shift the reverse driving clutch member 17 into engagement with the clutch teeth 34 in the block 23, and the pressure is applied until the motor becomes a brake means for the movement of the car and the car will be propelled in the reverse direction. When coaster wheeling is not desired, the clutch members 17 and 23, after being locked are held in permanent engagement in the manner before described, so that the propeller shaft and sliding gear shaft will turn in unison both in the forward and reverse movements of the car.

Having described my invention, what I claim as new and desire to secure by Letters Patent, is:—

1. In mechanism of the character described, the combination with the transmission sliding gear shaft, the propeller shaft, an intermediate shaft and a universal joint connection between the latter shaft and the propeller shaft, a circular block rigidly mounted on the intermediate shaft; a cylindrical member rigidly mounted on the sliding gear shaft which surrounds said block and means interposed between the block and the cylindrical member which frictionally lock them together on the forward driving movement of the sliding gear shaft but permit independent movement of the shafts when the speed of the propeller shaft exceeds that of the sliding gear shaft, or when the latter shaft is reversed; said block having clutch elements on its face, of a member slidably but nonrotatably mounted on the sliding gear shaft, a clutch member adapted to be shifted into engagement with the clutch elements on the face of the block, on the reverse movement of the sliding gear shaft, and means for normally preventing the sliding movement of said slidable member.

2. In mechanism of the character described, the combination with the sliding gear shaft, the propeller shaft, an intermediate shaft, and a universal joint connection between the latter shaft and the propeller shaft; of a circular block rigidly mounted on the intermediate shaft, having a circular series of internal clutch teeth in its front face, a member slidably but nonrotatably mounted on the sliding gear shaft, a driving clutch member having peripheral clutch teeth and adapted to be shifted by the said slidable member on the reverse movement of the sliding gear shaft to cause its clutch teeth to engage the clutch teeth in the face of the block, means for normally preventing the sliding movement of said slidable member and other clutch connections between the sliding gear shaft and the block, whereby the propeller shaft is operated on the forward driving movement of the sliding gear shaft, or the shafts are permitted to run independently when the speed of the propeller shaft exceeds that of tht sliding gear shaft.

3. In coaster wheeling mechanism of the character described, the combination with the sliding gear shaft, the propeller shaft, an intermediate shaft, a universal joint connection between the latter shafts, and means operated by the sliding gear shaft on its forward driving movement for rotating the intermediate shaft, but permitting independent movements of the shafts in the reverse movement of the sliding gear shaft or when the speed of the propeller shaft exceeds that of the sliding gear shaft; of a toothed member slidably but nonrotatably mounted on the sliding gear shaft, a driving clutch element adapted to be shifted by said toothed member, on the reverse movement of the sliding gear shaft, a clutch member on the intermediate shaft which is engaged by said driving clutch element in its shifted position, and means for normally holding the slidable member against sliding movement.

4. In coaster wheeling mechanism of the character described, the combination with the sliding gear shaft, the propeller shaft, an intermediate shaft, and a universal joint connection between the latter shafts; of a circular block rigidly mounted on the intermediate shaft, clutch connections between the sliding gear shaft and the circular block for operating the propeller shaft on the forward driving movement of the sliding gear shaft, or permitting the sliding gear shaft and the propeller shaft to run independently when the speed of the latter shaft exceeds that of the sliding gear shaft, a spirally toothed pinion slidably but nonrotatably mounted on the sliding gear shaft, a ring clutch member axially geared upon said pinion, a cooperating clutch member on the opposing face of said block, said ring clutch member being shifted by said pinion into engagement with its cooperating clutch member on the reverse movement of the sliding gear shaft, and means for normally preventing sliding movement of the said pinion.

5. The combination with the sliding gear shaft, the propeller shaft, an intermediate shaft, a universal joint connection between the latter shafts and clutch members associated with the sliding gear shaft and the intermediate shaft, whereby the propeller shaft is driven on the forward movement of the sliding gear shaft or the shafts are permitted independent movement when the speed of the propeller shaft exceeds that of the sliding gear shaft; of a spirally toothed pinion slidably but nonrotatably mounted on the sliding gear shaft, a ring axially geared upon said pinion and having a series of peripheral clutch teeth, an annular series of cooperating clutch teeth in the face of the clutch member on the intermediate shaft, said ring being shifted by the pinion on the reverse movement of the sliding gear shaft to cause its teeth to engage the said annular clutch teeth, a grooved flange on the forward end of said pinion, a ring having an annular groove, pins extending from said ring and shoes on their ends which enter the groove in the pinion flange, a yoke having end rollers which enter the groove in said ring; a support, a rod mounted in said support and rigidly connected to said yoke, a spring connected with said rod and said support for exerting a torsional action on said rod to cause said yoke, the ring and shoes supported thereby, to hold said pinion against sliding movement, and manually operable means for swinging said yoke to slide said pinion with its clutch ring, to cause said clutch ring to engage its cooperating clutch member.

6. In coaster wheeling mechanism of the character described, the combination with the sliding gear shaft, the propeller shaft and a clutch element associated with the propeller shaft; of a spirally toothed pinion slidably but nonrotatably mounted on the sliding gear shaft and a flange on its forward end provided with an annular groove, a shiftable ring, pins extending therefrom, shoes on said pins which enter said annular groove, and means including a spring, for normally holding said ring against movement thereby to prevent sliding movement of the pinion, a reverse clutch ring axially geared upon said spirally toothed pinion and provided with peripheral clutch teeth, a circular series of internal clutch teeth in the front face of the clutch element associated with the propeller shaft, said clutch ring being shifted by the spirally toothed gear on the reverse movement of the sliding gear shaft, to cause its clutch teeth to engage the said internal clutch teeth on the clutch member associated with the propeller shaft, and manually operable means for shifting said shoe supporting ring to slide said pinion, when desired, to lock said clutch ring with its cooperating clutch teeth.

7. In mechanism of the character described, the combination with the sliding gear shaft and the propeller shaft, and reverse clutch elements associated with said shafts, the clutch element associated with the sliding gear shaft being a shiftable driving element which is inoperative on the forward driving movement of the sliding gear shaft and is provided with a spirally toothed axial hole; of a spirally toothed pinion slidably but nonrotatably mounted on the sliding gear shaft and operatively fitting the hole in the said driving clutch element, said pinion acting to move the driving element into operative engagement with the other element, on the reverse movement of the sliding gear shaft, means for normally holding the pinion against sliding movement, and manually operable means connected with the said holding means for sliding said pinion to lock its driving clutch element to the other clutch element when desired.

8. In mechanism of the character described, the combination with the sliding gear shaft, the propeller shaft, clutch elements associated with said shafts for operating the propeller shaft on the forward movement of the sliding gear shaft, and for permitting independent movements of said shafts when the speed of the propeller shaft exceeds that of the sliding gear shaft, the clutch element associated with the propeller shaft having internal clutch teeth in its front face; of a member slidably but nonrotatably mounted on the sliding gear shaft, a reverse driving clutch member mounted on said slidable member, and moved thereby into engagement with the said internal clutch teeth on the reverse movement of the sliding gear shaft, said reverse driving clutch member having peripheral clutch teeth, means for normally holding the pinion against sliding movement, and manually operable means connected with the said holding means for shifting said pinion to lock the reverse driving clutch member with its cooperating clutch member when desired.

EDWIN P. MAYNARD.